Nov. 5, 1957  H. E. CHAPLIN  2,812,146
COMBINED SEATBACK AND HEADREST
Filed March 10, 1954
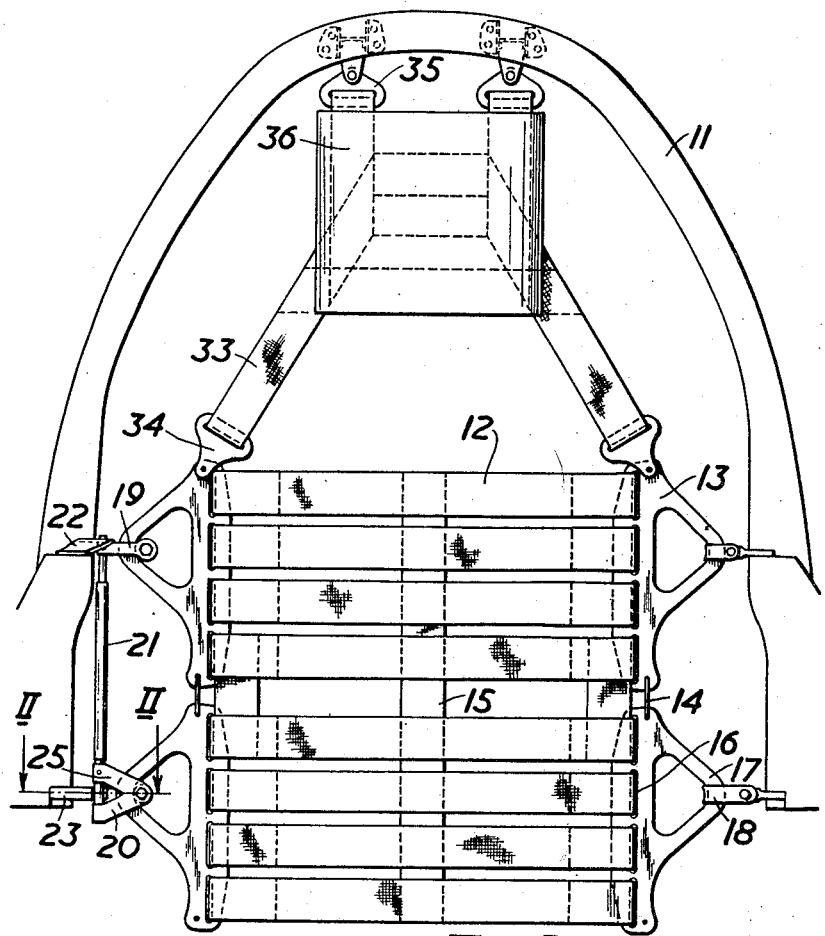
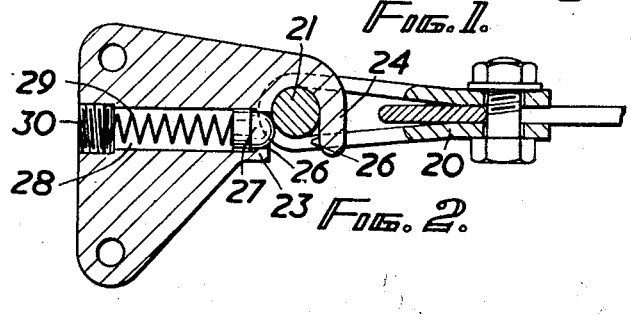
INVENTOR
HERBERT E. CHAPLIN
BY Watson, Cole, Grindle & Watson
ATTORNEYS United States Patent Office 2,812,146
Patented Nov. 5, 1957

2,812,146

COMBINED SEATBACK AND HEADREST

Herbert Eugene Chaplin, Hayes, England, assignor to The Fairey Aviation Company Limited, Hayes, England, a British company Application March 10, 1954, Serial No. 415,324

Claims priority, application Great Britain March 13, 1953

3 Claims. (Cl. 244—122)

This invention relates to seats for aircraft, vehicles and the like; referred to herein as craft. It is an object of the invention to provide a seat having a back that is strong and comfortable, light in weight, and easy to fix in position and to remove again, or having any one of these characteristics.

According to the present invention a seat back for a craft includes a flexible back piece having opposite ends anchored to side members connected or adapted to be connected to the structure of the craft so as to be held apart by it against tension in the back piece.

Such a seat back is suitable for use for example in an aircraft where it may be required temporarily to add additional seats. For example if it is desired to carry troops in a large transport aircraft a number of these seat backs can be quickly assembled in the fuselage and when the craft is again wanted for transporting goods they can be just as quickly removed and stowed away.

One of the side members may be connected or adapted to be connected to the structure of the craft in such a way that it will be readily detachable, for example merely by movement of itself, as by disengagement of one or more hooks. It will preferably be arranged that the weight of the occupant acts in a direction to hold the readily detachable side member in its place connected to the side of the craft.

Such an arrangement is particularly applicable where a man may have to step on or over a front seat to reach a back seat. When he wishes to get out, the occupant of the back seat can quickly detach the one side member of the front seat back and push it to one side, thereby clearing a passage for himself. Alternatively both side members may be similarly readily detachable from the structure of the craft.

Whether or not one or both of the side members is readily detachable from the structure of the craft, one or both may be connected to the structure of the craft through a joint allowing turning about any axis.

The back piece may comprise a number of flexible tension members each having opposite ends anchored to the side members; the flexible tension members are preferably in the form of flat strips, for example of webbing. The seat back may also be provided with a head pad carried by one or more flexible tension members extending from the top of the back piece to one or more parts of the structure of the craft above it.

The side members may be of generally triangular shape, of which shape one apex is adapted to be connected to the structure of the craft and the opposite side is anchored to an end of the back piece or an end of each of the flexible tension members included in the back piece. There may be two side members on each side, one above the other.

The invention may be carried into practice in various ways and one specific embodiment of the invention, as applied to a seat in an aircraft, it will now be described by way of example with reference to the accompanying drawings in which:

Figure 1 is a front view of a seat back according to the invention secured in position in the fuselage of an aircraft, and Figure 2 is a part section on the line II—II of Figure 1 to a larger scale.

The seat back shown is for the front seat of a craft in which two occupants sit one behind the other. It is connected to a part of the structure of the aircraft shown generally at 11. It has a back piece consisting of a number of strips of webbing 12 which may be about 3 inches wide and which extend horizontally one above the other with their ends in vertical alignment. The ends are anchored to side members 13 of which there are two on each side of the seat back one above the other. The top four strips of webbing are anchored to the top side members and the lower four strips to the lower side members. The upper and lower side members 13 at each side are connected together by a loop of cord 14. A single vertical strip of webbing 15 is stitched to the centre of the horizontal strips and provides additional strength.

Each side member 13 is a generally triangular-shaped plate, apertured for lightness, and having slots 16 along one side for receiving the ends of the strips 12 and at the apex opposite this side a narrow portion 17. The portion 17 of each side member on the right as viewed in Figure 1, is held in one of two metal rings 18 which are bolted to the structure of the craft vertically in line. There is thus formed a joint which permits a certain degree of turning of the side member 13 in relation to the ring 18 about any axis.

The side members 13 at the other side of the seat back are identical with those at the right-hand side but the portions 17 of these are secured to shackles 19 and 20 which carry between them a vertical rod 21. Bolted to the side of the craft structure are two brackets, an upper bracket 22 and a lower bracket 23. The upper bracket 22 is provided with an eye which can just admit the rod 21. The lower bracket 23 is in the form of a hook 24 which is just wide enough to admit the rod 21. This lower bracket 23 is shown more clearly in Figure 2 in which the rod 21 is shown in position in the hook 24. The arms 25 of the shackle 20 lie one upon and one below the sides 26 of the hook and prevent vertical movement of the rod 21 as long as the lower end is in the hook. A ball detent 27 is positioned in one end of a hole 28 in the side of the lower bracket 23 and is urged towards the hook 24 by means of a spring 29 which bears against a plug 30, screwed into the other end of the hole 28.

When the rod 21 is pushed into the hook 24 the ball detent 27 is pushed back into the hole 28 to allow the rod to enter the hook. The ball detent is then urged outwards again by the spring and acts to hold the rod in the hook. When it is required to remove the rod from the hook, forward pressure on the rod will push the ball detent 27 up into the hole 28 to allow the rod to come out.

Thus the seat back can be connected to the structure of the craft at the left hand side by inserting the top of the rod 21 upwards into the eye in the upper bracket 22 and then pushing the lower end of the rod 21 into the hook 24 in the lower bracket 23 by pivoting the rod about its top end in a rearward direction.

The seat back is readily detachable from the structure of the craft; the rod 21 can be pushed out of the hook 24, in the lower bracket 23 and then lowered until its upper end comes out of the eye in the upper bracket 22. The seat back, being flexible, can be pushed to one side (the right hand side as shown in Figure 1) to allow a passenger to move along the fuselage. It will be observed that the left-hand side member can be detached from the structure of the craft merely by movement of itself. If it is necessary for the occupants to get out of the craft in a hurry, the one in the front seat can get out at the side where the seat back is fixed (the right hand side), while the other can, almost at the same time, unship the rod 21 at the other side and swing the back clear so that he can get out at the left hand side. The seat back may be connected to one or more parts of the structure of the craft above or below it. In Figure 1 are shown two strips of webbing 33 which are anchored at one end one to each of two small brackets 34 secured to the top side members 13, and at the other end one to each of two small brackets 35 secured to the top of the structure of the craft. These strips 33 carry a head pad 36. If it is not required that one side of the seat back should be readily detachable from the structure of the craft, all the side members 13 may be connected to the structure of the craft in the way shown at the right hand side of Figure 1.

The same seat can also be used in a larger aircraft for example a transport aircraft, which may be required occasionally to carry troops. A number of these seats may be assembled in a row, the outer side members 13 being connected to the sides of the fuselage and the intermediate side members 13 being connected together in pairs; thus three or four occupants can sit side-by-side. There may be a number of such rows one behind the other along the fuselage. These seats can be quickly put into place and as quickly removed again when it is required to transport a cargo requiring the whole width of the fuselage.

It will be seen that the invention provides a seat for aircraft and other vehicles that is strong and comfortable, light in weight, and easy to fix in position and to remove again.

What I claim as my invention and desire to secure by Letters Patent is:

1. An aircraft seating arrangement comprising an aircraft fuselage and a flexible seat back detachably secured to the two sides of the interior of the fuselage and extending in tension across the interior of the fuselage transversely to the fore-and-aft length thereof, the seat back comprising a flexible back member affording an area of support for the back of a user, rigid side members secured to both side edges of the back member, pivotal connections between one side of the aircraft fuselage and the rigid side members on one side edge of the back member, and quick release connecting means by which the rigid side members on the other side edge of the back member are secured to the other side of the fuselage to place the back member in tension between the two sides of the fuselage.

2. An aircraft seating arrangement as claimed in claim 1 in which the quick release connecting means comprises forwardly pointing hook means fixed to the side of the fuselage, a cooperating bolt member secured to the adjacent rigid side members of the seat back, and a ball catch fixed to said hook means and tending to retain the bolt member in an engaged position in which it is engaged behind the hook means, the bolt member being releasable from its engaged position by pushing it forwardly against the restraining action of the ball catch into a release position clear of the hook means.

3. An aircraft seating arrangement as claimed in claim 1 in which the seat back includes a separate head pad and flexible elongated supporting means carrying said pad, said means being secured at its upper and lower ends respectively to the roof of the fuselage and the upper edge of the seat back.

References Cited in the file of this patent

UNITED STATES PATENTS

| 1,480,890 | Milburn | Jan. 15, 1924 |
| 2,556,076 | Evans et al. | June 5, 1951 |
| 2,557,874 | Kailenta | June 19, 1951 |
| 2,586,262 | Robins | Feb. 19, 1952 |

FOREIGN PATENTS

| 18,530 | Great Britain | 1900 |
| 402,521 | France | Oct. 11, 1909 |